United States Patent [19]
Lazet

[11] 3,840,359
[45] Oct. 8, 1974

[54] PREPARATION OF HYDRATED ALKALI METAL SILICATE FLAKES

[75] Inventor: Frank J. Lazet, Media, Pa.

[73] Assignee: Philadelphia Quartz Company, Philadelphia, Pa.

[22] Filed: May 18, 1972

[21] Appl. No.: 254,702

[52] U.S. Cl.............................. 65/5, 65/13, 65/21, 106/52, 106/74
[51] Int. Cl...................... C03b 37/06, C03c 3/04
[58] Field of Search........... 106/52, 74, 73.5; 65/16, 65/21, 5

[56] References Cited
UNITED STATES PATENTS

| | | | |
|---|---|---|---|
| 1,357,183 | 10/1920 | Phillips et al. | 106/74 |
| 3,248,192 | 4/1966 | Millet | 65/16 X |
| 3,257,217 | 6/1966 | Van Drejer | 106/58 |
| 3,325,263 | 6/1967 | Day et al. | 65/21 |
| 3,498,802 | 3/1970 | Bickford et al. | 106/73.5 |
| 3,498,803 | 3/1970 | Stookey | 106/73.5 |
| 3,734,756 | 5/1973 | Pierce | 106/74 |

*Primary Examiner*—Helen M. McCarthy
*Attorney, Agent, or Firm*—Fred Philpitt; Ernest G. Posner

[57] ABSTRACT

I have discovered a new procedure for the manufacture of soluble silicate glasses with a high rate of solution and have evolved an improved dissolving procedure to take advantage of this new product. Finely divided soluble silicate glass particles are formed by first drawing a sheet of glass from a furnace and attenuating the sheet with a high pressure stream of water whereby there are formed a very large number of finely divided thin flaky iridescent pieces of silicate glass film hydrated to the extent of about 4% $H_2O$ or more. The solution is easily obtained by agitation of the hydrated glass particles in water at atmospheric pressure and temperatures required by the ratio and time factor.

4 Claims, 2 Drawing Figures

PATENTED OCT 8 1974
3,840,359
FIG. A.
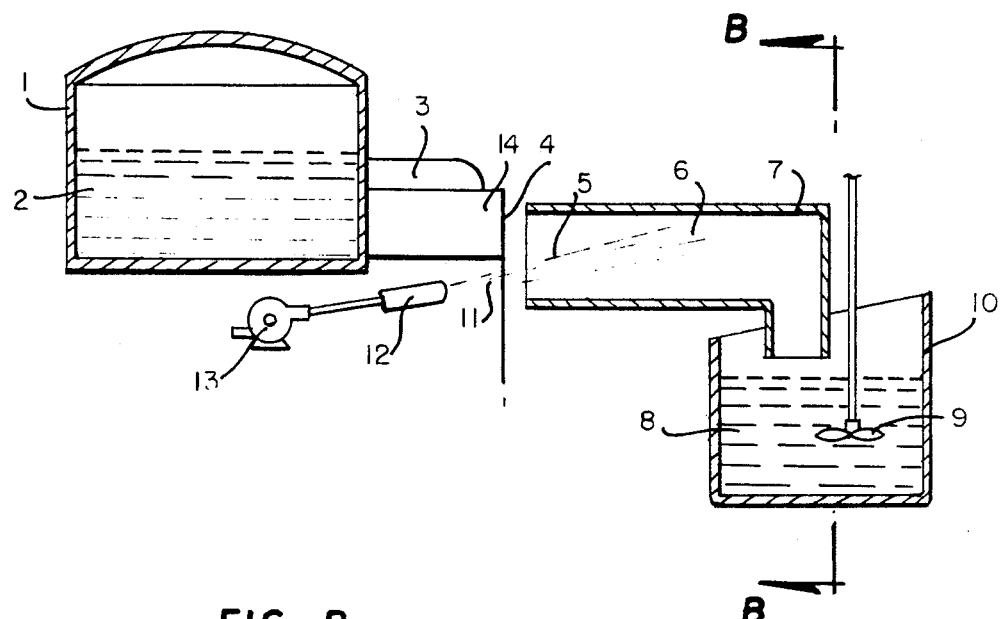
FIG. B.
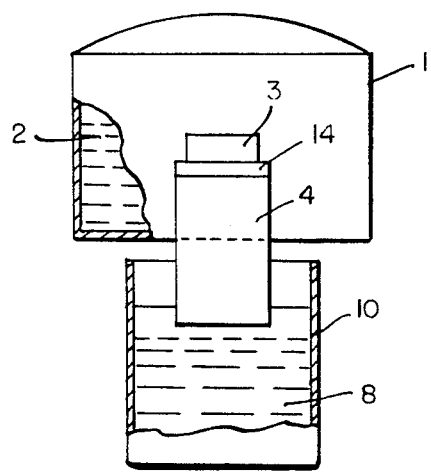

PREPARATION OF HYDRATED ALKALI METAL SILICATE FLAKES

This application is related to U.S. application Ser. No. 352,857 filed Apr. 18, 1973 which is a continuation-in-part of U.S. application Ser. No. 238,819 filed Mar. 28, 1972, now abandoned.

In the manufacture of solutions of soluble glass, there has long been need for a procedure by which the glass could be very rapidly dissolved without high capital costs for large equipment and for the concomitant production of a clear solution. The ordinary processes for dissolving soluble silicate glass always result in a highly opalescent solution even when alkaline ratios and de-ionized water are used.

Besides desiring to obtain a process for dissolving the glass at a high speed with the formation of a clear solution, it has been very desirable to be able to operate at a low temperature. In the past, it has been necessary to raise the temperature above the boiling point in order to obtain a speed of solution which would be economical even though it has been thought that rapid solution at lower temperatures would result in a clearer solution. It has also been known that when water having considerable hardness, that is more than about 20 parts per million of lime or magnesia, is used to dissolve the glass the resulting solution will be quite opalescent. Thus, in order to obtain clear solutions on a commercial scale it has usually been necessary to resort to reduction of hardness by base exchange and/or filtration of the product. The filter media required to clarify the solutions have usually been the source of additional contamination.

Now, I have found that if I withdraw the glass from a furnace at a very carefully controlled temperature and spread the glass out to a relatively thin film and then expose this film of hot viscous soluble silicate glass to a jet of water under pressure, the glass will be attenuated into a sheet of very thin glass which then breaks up into small iridescent flaky particles. These small particles may be readily collected and will have from 4 to 30% or more of water content depending on the water pressure and the amount of water available to the jet. These flakes will be non-caking if the water content is below about 25 or 30 percent and will dissolve in the water from the jet stream if sufficient water is made available, that is, about 40 to 65 percent or more of water in the final slurry. This slurry, depending somewhat on the water content, will dissolve the particles of glass and the dissolving is particularly efficient if the mixture is agitated to prevent the glass particles from agglomerating in the slurry. The agitation has the additional advantage of increasing the rate at which the particles dissolve.

A schematic description of my process is shown in the drawings. Drawing A is a sideview and Drawing B a front view.

In the drawings 1 is a reactor or furnace for melting glass, 2 is the molten glass, 3 is a forehearth for finishing and controlling the properties of the molten glass, 4 is a sheet of glass flowing over a lip 14, 13 is a pump forcing water through a nozzle 12 forming a jet of water 11 impinging the sheet of glass and forming the attenuated glass sheet 5 which breaks up into the hydrated flakes 6 which are carried by the jet 11 through a conductor 7 into a collector 10. The slurry of water and flakes 8 is aided in dissolving by the agitator 9.

The hydrated flakes produced by my process are generally iridescent and have a thickness of about 0.00025 but may vary from about 0.0156 to 0.00005 inch depending on the viscosity of the glass, the thickness of the sheet, the pressure of the water and the ratio of the glass. The particle diameter will vary from about 0.5 to about 0.02 inch, but will usually be in the neighborhood of 0.1 inch. If these particles are hydrated within the range of about 4 to 20 percent water, they will feel dry and even with 50 percent water, the particles will merely appear wet and the water will not drain away.

In the prior art, it has been recognized that the process of dissolving depends on a number of characteristics. Thus the relative size and charge of the cation affect the melting and dissolving characteristics since smaller ions and those of higher valency are held more firmly in the random network of the glass. The smaller the cation the higher the charge density and the tighter it is held so that the softening point is higher and the viscosity of a given ratio is higher. For this reason, potassium glasses are more soluble than sodium glasses and cesium glasses are more soluble than potassium glasses. On the other hand, lithium glasses are insoluble in ordinary practice. Furthermore, since the larger cations produce a looser structure, their glasses are easier to hydrate and therefore the rate of solution is greater and furthermore as the amount of alkali is increased with respect to the silica, the glasses become less viscous and the rate of solution is again increased. It is also recognized that rapid chilling prevents equilibrating adjustments and that the resulting strains tend to promote more rapid rates of solution. It is thought that the bonds are stretched and permit easier penetration by water.

Theoretically, dissolving of the glass begins to occur by ion exchange between the alkali metal ions in the glass and the aqueous phase. Thus this aqueous or water phase becomes alkaline because of the excess of hydroxyl ions produced and a layer of silanol groups is formed in the surface of the glass. In the second stage of the dissolving action, the silica is depolymerized, that is, there is a more complete hydration of the silica ions on the surface. Thus the rate of solution depends first on the ion exchange process and then on the strength of the surface layer of silanol groups and the diffusion rate of the hydrated alkali metal ions through the surface layer. Finally, the rate of solution is controlled by the removal of the hydrated silicate layer from the surface of the glass. These factors are all affected by the alkali metal ion and the ratio of the alkali metal ion to silica. The activation energy of the ion exchange process decreases rapidly with the increasing alkali content of the glass which means that the more alkaline glasses dissolve more rapidly. Since under these conditions, the alkali metal ion exchange occurs easily, the alkali metal ion concentration in the solution increases and the reverse exchange of alkali metal ions for hydrogen ions is enhanced and the protective silanol layer on the glass is disrupted. Again the rate of solution increases rapidly as the ratio of the glass decreases, that is as the glass becomes more alkaline.

In a more practical sense, the rate of solution is determined by the temperature, the silicate ratio, i.e., $SiO_2$:$Na_2O$, the degree of agitation, the impurities in the glass and the area of the glass available to the solution. The area of the glass surface is controlled by the particle size of the glass itself and the number of glass particles in the solution. Thus, in order to obtain a high concentration of solids in solution rapidly it is advantageous to use an excess of glass. The effect of this excess is evident up to about 200 percent of the glass which would be required to reach the usual commercial concentration.

Actually, the difference in the effect of ratio is indicated by the fact that a 2 ratio glass (i.e. 2 $SiO_2:Na_2O$) will dissolve about twice as fast as a 3 ratio glass and a 3 ratio glass will dissolve about three times as fast a 4 ratio glass. Also, the rate of solution is doubled by increasing the temperature from the boiling point to about 250°F.

Since a small amount of $Na_2O$ or $K_2O$ raises the pH very rapidly, the effect of pH is not very great between about 11 and 14. Agitation itself is very important, but there is very little difference in rate after a necessary low level is obtained. Thus, there is practically no difference in the rate when an autoclave is rotated at 3 rpm compared to one rotated at 24 rpm. However, some agitation is important in removing the hydrated surface layers.

In line with the dependence of the rate of solution on the rate at which the alkali can diffuse into the glass, the prehydration becomes important. In the case of a glass having a 2.0 ratio, a particle size below about 200 mesh, with 25 percent solids, 75 percent would dissolve in one minute at 25°C, when the glass contained 18 percent of water. With only 5 percent more water content, 75 percent would be dissolved in less than 5 seconds. Thus the amount of water present initially in the glass itself is very important when rapid solution is desired. Similarly increasing the proportion of larger cations will increase the rate at which a glass dissolves. Thus when a sodium di-silicate glass requires at least 18 minutes to dissolve, one in which half of the alkali has been replaced with potassium oxide, having otherwise the same characteristics, will dissolve in only 5 minutes.

The effect of area may also be shown by comparing the amount of solids dissolved when a sodium disilicate glass has been classified to the fraction between 45 (0.013 inch) and 65 mesh (0.108 inch). Thus such a glass will take 90 minutes to dissolve under given conditions whereas if the glass has been classified to between 150 (0.004 inch) and 200 mesh (0.003 inch) only 18 minutes will be required to dissolve. Such a glass broken down by grinding will have a relatively small area for each particle, approximately the area of a sphere.

Many procedures have been investigated for the preparation of fine glasses which will dissolve more rapidly. It has been attempted to atomize glass by first heating it to high temperatures and then breaking it up into small spheres by various procedures such as blasting with hot air or steam or gas or using a wheel to throw out particles. One of the difficulties of these procedures is that the surface of the glass tends to be reduced in alkali content by exposure to high surface temperatures, thus making the particles relatively more difficult to dissolve. It has also been attempted to form very narrow glass fibers. These can be obtained at somewhat lower temperatures than the usual atomization procedures, but they also have suffered from similar difficulties. Various methods of producing flake glass have been attempted, usually by mechanical means, but it has not been possible to obtain particles of fine enough structure at reasonable cost to make this process significant.

By our process, we obtain flakes of entirely different characteristics from those of the prior art. These flakes are rapidly chilled and are highly strained. They are iridescent showing that the thickness of the flakes is of colloidal dimensions. According to our microscopic examination these flakes may range below about 0.0156 inch. Furthermore, by our process, we are able to obtain flakes with 4 percent or more water content depending on our requirements. Similar flakes with lower water content are described in co-pending application Ser. No. 352,857. The result is that it is possible to dissolve our flakes with about 4 percent of water up to commercial concentrations with no excess glass in a matter of minutes. For example at 3.22 ratio, 5 percent of water and at 210°F, a 41° Baume solution is obtained in less than 5 minutes. Any fortuitous larger particles of atomized glass may be separated by gravity before or after dissolving as these take much longer to dissolve completely. The ultimate is, of course, a commercial solution obtained during the process of flaking and collecting the product.

INVENTION IN GENERAL

In this process, I cause a thin sheet of glass to be intercepted and carried along, that is impinged, by a jet of water. This glass must have a viscosity within the range of about 800 to 1000 Poise (P) and more preferably within a very narrow range of 850 to 950 P. The glass is a binary alkali metal silicate in the standard dissolving range of ratios. While the examples and the claims are directed to sodium silicates, it is clearly stated above that the other alkali metal silicates having cations with larger atomic diameters are equivalent when the known variations in properties are taken into account.

While ratios more alkaline than about 1.3 $SiO_2:Na_2O$ may be used, I ordinarily will employ ratios ranging from 1.5 $SiO_2:1$ $Na_2O$ to about 4 $SiO_2:1$ $Na_2O$. The temperatures will be those which are required to provide the above viscosity at the given ratio. For instance at 2.35 $SiO_2:1$ $Na_2O$, the temperature range for 850–950 P is about 1940° to 1980° F, (1060°C–1080°C) whereas for 3.22 ratio, the temperature range is about 2080° to 2120°F. (1140°C to 1160°C).

The sheet of glass should be as thin as convenient. In general I like to employ a sheet which is less than 0.25 inch thick at the point of the impact or impingement of the jet and preferably less than 0.125 inch thick. The water jet is designed to provide a thin flat profile at the intersection with the glass at a pressure from about 100 to 1000 psig. Actually I prefer the lower pressure range of about 100 to 500 psig. The pressure has to be sufficient to carry the glass sheet along its upper surface and to attenuate the glass until it breaks into small flakes. More than this pressure is unnecessary and less satisfactory results are obtained at pressures much higher than the required minimum. The amount of water in the jet can be regulated according to the amount of water required in the final product. A rate of 5 – 25 gallons per minute has been found quite satisfactory. This may range from an essentially dry flake containing only about 4 percent water to a moist mass of flakes with 50–60 percent water, up to an actual slurry, but in general the maximum amount of water used will be that required to form the final commercial solution. This ranges from about 40 to 70 percent.

As stated above, the product will be thin flakes having a thickness of about 0.01 to about 0.00005 inch in thickness and perhaps more generally between about 0.001 to 0.00025 inch. These are iridescent flakes having a diameter of from about 0.015 to 1 inch and generally in the neighborhood of about 0.125 inch and a water content of preferably from about 4 to 10 percent and generally from about 4 to 6 percent and having of course the ratio of the initial glass. These flakes are iridescent and dissolve much more rapidly than glass particles ground to pass 325 mesh (0.0017 inch).

The product may be in the form of these dry flakes or in the form of a moist mass containing 30 percent or more of water or may be in the form of a slurry depending on the excess water used.

In carrying out the complete solution of these flakes, I pass the composition of water and fine flakes into an agitated tank. At glass weight ratios such as 2.35 $SiO_2$:-$Na_2O$, a clear solution will be obtained at commercial concentrations within 5 minutes even when using water with 350 parts of hardness. With higher weight ratios such as 3.22 $SiO_2$:$Na_2O$ it is sometimes more convenient to use a series of tanks with the partially dissolved flakes flowing as a slurry from one tank to another until the solution is complete. If it is desired, less water may be used in forming the flakes than is required for the final solution and the flakes with the residual water will be then passed into a solution of sodium silicate having a concentration adjusted to provide the final desired concentration.

It also may be helpful to blow the flakes along at a speed which will permit unflaked glass to drop out or it may be preferable to arrange to settle the final solution to permit undissolved glass particles to separate from the commercial solution.

EXAMPLES

The following examples are to be considered merely as illustrative and not in any sense restrictive of the limits of the invention.

EXAMPLE 1

In this example, a sodium silicate glass having a 2.35 $SiO_2$:$Na_2O$ weight ratio was drawn from a furnace through a forehearth. The glass flow rate was 4000 lbs/hr and the glass was drawn over the lip of the forehearth, 16 inches wide, and at a glass temperature of 1970°F (1077°C). The width of the glass at the point of atomization was about 14 inches. At this point it was hit or impinged by a jet of water flowing at the rate of 10 gal. per minute and under a pressure of 1800 psig at the pump, i.e. about 650 psig at the nozzle. The glass was converted into a flat flaky product, very thin and less than 0.001 inches in thickness with much of the product quite iridescent, indicating a thickness of only a few microns. Much of the product was agglomerated because the amount of water was somewhat low at 10 gallons per minute. For the nozzle, we used a flat jet nozzle with a 7/64 inch orifice Model PSS1520 sold by Spraying Systems Inc.

The glass was dry in appearance and was found to have the following analysis:

| | |
|---|---|
| Loss at 200° C iin 24 hours | 3.08% |
| Ignited Loss | 4.83% |
| $CO_2$ | 0.18% |

When examined by a microscope, the iridescent flakes were found to be about 0.00025 inch thick. This glass dissolved with minimum agitation at about 70°F initially, using ordinary hard water at 350 ppm of hardness. The heat of solution raised the mixture to boiling and the solution was very quickly raised to 70° Baume and was water white. The glass went into solution extremely fast compared to standard dissolving practices. Thus a commercial ground glass of the same ratio took 60 minutes to reach 46.5° Be in boiling water with 25 percent excess glass.

EXAMPLE 2

In this test, 2.35 ratio glass was run at a rate of 4000 to 4500 lbs. per hour with the glass temperature at the lip of 1935°F (1057°C) and the pump pressure at 2400 psig (or 1600 psig at the nozzle). With the water flowing at 10 gallons per minute, very thin flakes were made, whereas when the pressure built up and the water flow reached 15 gallons per minute, more granular particles were produced. The glass temperature was low in this example.

EXAMPLE 3

In this test with a glass flow rate of 4000 – 4500 lbs. per hour, the glass temperature averaged about 1970°F. The water flow rate was 15 gallons per minute with a pump pressure of 2500 psig. A series of seven jets using a 0.046 inch diameter orifice on 2 inch centers was used. The nozzles were the same as those described in Example 1.

We obtained a very high percentage of thin flakes which resembled chopped up cellophane. These were measured at about 0.001 inch or less in thickness.

The product dissolved very rapidly from its own heat of solution in the water from the jet and the liquid in the drum had a gravity of 52.6° Baume at 20° C.

EXAMPLE 4

In this example, again with a glass ratio of 2.35 and the glass temperature at 1975°F (1079°C) the flow rate was 2820 lbs per hour. The nozzle arrangement was the same as described in the previous example. The water flow rate was 15 gallons per minute with a pump pressure of 2400 psig. The product was very uniform in texture and consisted of some short fibers 0.001 inch in diameter and mostly of flakes of dust and larger thick flakes.

The product dissolved very rapidly in its own water and formed a water white product at 49° Baume and 44 percent solids. The flakes coming from the jet contained about 50 percent water but were only damp to the touch.

EXAMPLE 5

In this example, 3.10 $SiO_2$:$Na_2O$ weight ratio glass at 4,000 to 4500 pounds per hour and with a temperature of 2050°F (1121°C) was broken up with 15 gallons per minute of water with a pump pressure of 1,900 psig. At this ratio, the glass was too cold and I obtained only gobs and coarse particles.

The glass temperature was raised to 2,140°F (1191°C) and fairly good atomization was obtained.

The particles consist of fibers up to 6 inches long and as large as 0.004 inches in diameter and iridescent flake particles about 0.125 to 0.25 inch in diameter. However, in this case the glass ribbon initially 16 inches across was reduced to 8 inches by the pull of the jet stream.

In a subsequent test at 3,000 lb/hr, a glass ratio of 3.27, and a temperature of 2,100°F (1149°C), I pulled out the glass to the full width of 16 inches and obtained primarily flake particles having a thickness of about 0.00025 inches under these conditions. Somewhat better results were obtained at 2400 psig (1600 psig at the nozzle) rather than 1400 psig (500 psig at the nozzle). These flakes when dissolved in a container with a high speed mixer reached 38° Be in less than 10 minutes.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

I claim:

1. In the process for producing soluble glass in fine particulate form by attenuating a sheet of molten silicate glass comprising the steps of passing a molten glass ribbon across a narrow horizontal slit-like nozzle with a pressurized stream passing through said nozzle, the improvement wherein said molten glass is a binary glass which has a viscosity of 800 to 1000 Poises, a ribbon thickness of less than 0.25 inch, and a 1.5 to 4.0:1.0 mole ratio of $SiO_2$ to alkali metal oxide, and utilizing water at 100 to 1600 psig passed through said nozzle at a rate of 5 - 25 gallons per minute as the force to simultaneously cool, break-up and hydrate said molten glass resulting in iridescent flake formation, said flakes having a thickness of 0.001 to 0.00025 inch, a diameter of 0.5 to 0.02 inch and being hydrated to at least 4 and up to 25 percent on a weight basis, the percent of hydration being controlled by the water introduced through the nozzle, essentially all of said water being combined with said flakes as water of hydration.

2. The process of claim 1 wherein said jet of water is at a pressure of 100 to 1000 psig.

3. The process of claim 1 wherein the viscosity of said molten glass ribbon is between 850 and 950 Poises.

4. The process of claim 1 wherein the resultant flakes are hydrated to a water content of 4 to 10 percent.

* * * * *